(12) United States Patent
Honda et al.

(10) Patent No.: US 7,187,417 B2
(45) Date of Patent: Mar. 6, 2007

(54) VIDEO SIGNAL PROCESSING APPARATUS THAT PERFORMS FRAME RATE CONVERSION OF A VIDEO SIGNAL

(75) Inventors: Hirofumi Honda, Yamanashi-ken (JP); Takashi Okushima, Yamanashi-ken (JP); Tetsuro Nagakubo, Yamanashi-ken (JP)

(73) Assignees: Pioneer Corporation, Tokyo (JP); Pioneer Display Products Corporation, Shizuoka-ken (JP)

( * ) Notice: Subject to any disclaimer, the term of this patent is extended or adjusted under 35 U.S.C. 154(b) by 535 days.

(21) Appl. No.: 10/388,169

(22) Filed: Mar. 14, 2003

(65) Prior Publication Data

US 2004/0017510 A1 Jan. 29, 2004

(51) Int. Cl.
*H04N 7/01* (2006.01)
*H04N 11/00* (2006.01)
(52) U.S. Cl. .................. 348/459; 348/441; 348/558
(58) Field of Classification Search ............ 348/441, 348/443, 459, 449, 558, 584
See application file for complete search history.

(56) References Cited

U.S. PATENT DOCUMENTS

| 3,584,148 | A | * | 6/1971 | Flory ........................... 348/97 |
| 3,778,545 | A | * | 12/1973 | Metzger et al. ............. 348/103 |
| 4,581,642 | A | * | 4/1986 | Poetsch et al. ............. 348/620 |
| 5,181,100 | A | * | 1/1993 | Hodgson ..................... 348/594 |
| 5,185,666 | A | * | 2/1993 | Capitant et al. ............ 348/588 |
| 5,550,592 | A | * | 8/1996 | Markandey et al. ........ 348/448 |
| 5,852,473 | A | * | 12/1998 | Horne et al. ................ 348/558 |
| 6,069,664 | A | * | 5/2000 | Zhu et al. ................... 348/448 |
| 6,144,410 | A | * | 11/2000 | Kikuchi et al. ............. 348/441 |
| 6,191,824 | B1 | * | 2/2001 | Ogawa ........................ 348/555 |
| 6,563,550 | B1 | * | 5/2003 | Kahn et al. ................. 348/700 |

\* cited by examiner

*Primary Examiner*—Victor R. Kostak
(74) *Attorney, Agent, or Firm*—Sughrue Mion, PLLC

(57) ABSTRACT

A video signal processing apparatus which performs a frame-rate conversion of a progressive line-scan video signal based on a film source of M film frames per second (wherein M is a natural number) into a video signal in which a same film frame is repeated N times for each 1/M second, and mixes, frame by frame, a video signal of a preceding frame and a video signal of a following frame of the converted progressive line-scan video signal. Thus, the display quality of telecine-converted images can be improved.

7 Claims, 6 Drawing Sheets

FIG. 4A

| VA | VA | VA | VB | VB | VB | VC | VC | VC |

FIG. 4B

| k=1 | k=1 | k=1 | k=⅓ | k=½ | k=1 | k=⅓ | k=½ | k=1 |

FIG. 4C

| VA | VA | VA | ⅓VB | ½VB | VB | ⅓VC | ½VC | VC |

FIG. 4D

| 1-k=0 | 1-k=0 | 1-k=0 | 1-k=⅔ | 1-k=½ | 1-k=0 | 1-k=⅔ | 1-k=½ | 1-k=0 |

FIG. 4E

| VA | VA | VA | ⅔VA+⅓VB | ⅓VA+⅔VB | VB | ⅔VB+⅓VC | ⅓VB+⅔VC | VC |

FIG. 4F

| VA | ⅔VA+⅓VB | ⅓VA+⅔VB | VB | ⅔VB+⅓VC | ⅓VB+⅔VC |

FIG. 4G

| ⅔VA | ⅓VA+⅙VB | ⅔VB | ⅓VB+⅙VC |

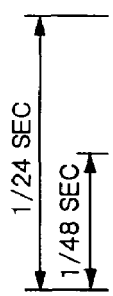

VIDEO SIGNAL PROCESSING APPARATUS THAT PERFORMS FRAME RATE CONVERSION OF A VIDEO SIGNAL

BACKGROUND OF THE INVENTION

1. Field of the Invention

The present invention relates to a video signal processing apparatus that processes an input video signal to display at high quality on a display device, the input video signal being a telecine-converted video signal generated by a conversion system, such as the 2-3 pulldown conversion system, from a film.

2. Description of the Related Background Art

Video signals of a standard television format, such as the NTSC format, often include video signals based on films. A film is made of 24 frames per second. A video signal of the standard television format is made of 30 frames per second, and is an interlaced scan video signal having two fields for each frame. Since the number of frames per second differs between a video signal and a film, each frame of the film is usually telecine-converted by the 2-3 pulldown conversion system to obtain a video signal of the standard television format.

In the 2-3 pulldown conversion system, the first and the second field of the first frame of a video signal are produced from the first film frame, the first and the second field of a second frame and a first field of a third frame of the video signal are produced from the second film frame, and the second field of the third frame and the first field of a fourth frame of the video signal are produced from the third film frame. The following frames are converted similarly, so that two fields, three fields, two fields, three fields, etc. of the video signal are respectively produced from each consecutive film frame.

Thus, two film frames correspond to five frames of a standard television format video signal, and each film frame is alternately converted into a video signal of two fields and a video signal of three fields.

However, when a video based on the interlaced scan video signal which is telecine-converted is displayed on a display device, such as a PDP, then, for example, the third frame of the consecutive frames of the video signal is combined from images of the second and the third frames of the film. Therefore, there was a problem that the image quality is poorer than that of an original film.

In order to solve the problem, the applicant for this application has proposed a video signal processing apparatus that improves the display quality for telecine-converted images. As shown in FIG. 1, the video signal processing apparatus includes a 2-3 period detection circuit 1, a progressive scan conversion circuit 2, a selector switch 3, memories 4 and 5, a selector switch 6, a memory control circuit 7, and a conversion control circuit 8. The 2-3 period detection circuit 1 determines whether an input video signal is a signal portion of two fields or a signal portion of three fields per film frame. In response to a detection signal from the 2-3 period detection circuit 1, the progressive scan conversion circuit 2 converts the video signal into a video signal of a progressive line scan. For signal portions corresponding to two fields, the video signal of the two fields is temporarily stored and then alternately output for each field. For signal portions corresponding to three fields, the video signal of the first two fields is temporarily stored and then alternately output for each field. That is, if the 2-3 period detection circuit 1 detects a still picture field that is the same in two consecutive frames, then that still picture field is ignored. The selector switch 3 relays the output video signal of the progressive scan conversion circuit 2 to the memory 4 or 5. The memory control circuit 7 controls writing into the memories 4 and 5 and reading from the memories 4 and 5 for the video signal. The selector switch 6 outputs the video signal selectively read out from the memory 4 or 5. The conversion control circuit 8 controls timing for the switching of the selector switches 3 and 6 as well as the writing and reading with the memory control circuit 7.

In the video signal processing apparatus with the above configuration, assuming that the input video signal is a video signal that has been telecine-converted by 2-3 pulldown, then the video signal is converted into a sequence of fields as shown in FIG. 2B corresponding to film frames A, B, C, D and so on, as shown in FIG. 2A. The length of each film frame is $1/24$ second, whereas the length of each field is $1/60$ second.

The progressive scan conversion circuit 2 converts the telecine-converted video signal into a progressive line-scan video signal, so that it generates a video signal portion VA for one screen, as shown in FIG. 2C, by obtaining a video signal portion line by line in alternation from the first field A1 and the second field A2 of the first frame in FIG. 2B. A video signal portion VB for one screen is generated by obtaining a video signal portion line by line in alternation from the first field B1 and the second field B2 of the second frame in FIG. 2B. Subsequently, video signal portions VC and VD are generated in a similar manner. The length of each of these video signal portions VA, VB, VC and VD is $1/30$ second.

The memory control circuit 7 writes the video signal that is output by the progressive scan conversion circuit 2 via the selector switch 3 in alternation into the memories 4 and 5. The switching of the selector switch 3 is controlled by the conversion control circuit 8. The writing is performed at 24 Hz by thinning out the video signal. Assuming that the video signal portion VA is thinned out and written into the memory 4 as shown in FIG. 2D, then the video signal portion VB is subsequently thinned out and written into the memory 5 as shown in FIG. 2E. Then, the video signal portion VC is thinned out and written into the memory 4, and the video signal portion VD is thinned out and written into the memory 5.

The video signal portions VA, VB, VC and VD, which have been thinned out and written into the memories 4 and 5 as described above, are read out under the control of the memory control circuit 7. The reading is performed at 48 Hz, and is carried out twice in repetition for each of the memories 4 and 5. That is, as shown in FIG. 2F, the video signal portion VA is read out twice from the memory 4, and then, as shown in FIG. 2G, the video signal portion VB is read out twice from the memory 5. Similarly, the video signal portion VC is read out twice from the memory 4, and then the video signal portion VD is read out twice from the memory 5.

The video signal read out from the memories 4 and 5 is obtained via the selector switch 6. The selector switch 6 is switched by the conversion control circuit 8 to the side of the memory 4 when reading from the memory 4 and is switched to the side of the memory 5 when reading from the memory 5.

For the video signal portion VA read out from the memory 4 in the manner described above, an image based on that video signal portion VA is repeated twice and displayed for $1/48$ second each time, as shown in FIG. 2H. Also for the video signal portions VB, VC and VD from the memories 4 and 5, an image based on each of those video signal portions is repeated twice and displayed for $1/48$ second each time.

That is, as in the film frames shown in FIG. 2A, the displayed video have one frame every 1/24 second.

It should be noted that each of the video signal portions VA, VB, VC and VD thinned out and stored in the memories 4 and 5 may also be repeatedly read out by n times at n 24 Hz, wherein n is an integer of 2 or greater. For example, if each of the video signal portions is repeatedly read out by three times at 72 Hz, then the video signal portion VA is repeatedly read out by three times from the memory 4 as shown in FIG. 2I, and then the video signal portion VB is repeatedly read out by three times in repetition from the memory 5 as shown in FIG. 2J. Similarly, the video signal portion VC is repeatedly read out by three times from the memory 4, and then the video signal portion VD is repeatedly read out by three times from the memory 5. For the video signal portion VA read out from the memory 4, an image based on that video signal portion VA is repeated by three time and displayed for 1/72 second each time, as shown in FIG. 2K. Also for each of the video signal portions VB, VC and VD from the memory 4 or 5, an image based on each of those video signal portions is repeated by three times and displayed for 1/72 second each time. That is, as in the film frames shown in FIG. 2A, the displayed video have one frame every 1/24 second.

However, when converting the frame rate of a telecine-converted video signal as shown in FIG. 2A to FIG. 2K, then an image of one film frame is displayed consecutively by a plurality of times (for example three times) for each 1/24 second. Thus, since displayed moving pictures are watched as if they moves jaggedly by the viewer, there is a problem of flickering.

SUMMARY OF THE INVENTION

It is, therefore, an object of the present invention to provide a video signal processing apparatus which can further improve the display quality for telecine-converted images.

According to the invention, there is provided a video signal processing apparatus comprising: a frame-rate converter which performs a frame-rate conversion of a progressive line-scan video signal based on a film source having M film frames per second (wherein M is a natural number) into a video signal in which a same film frame is repeated by N times for each 1/M second (wherein N is an integer of two or greater); and a mixer which mixes, frame by frame, a video signal of a preceding frame and a video signal of a following frame of the progressive line-scan video signal converted by the frame-rate converter.

BRIEF DESCRIPTION OF THE DRAWINGS

FIGS. 4A to 4G illustrate the operation of various portions of the apparatus in FIG. 3 for a video signal of one frame per 1/72 second.

FIGS. 5A to 5G illustrate the operation of the various portions of the apparatus in FIG. 3 for a video signal of one frame per 1/96 second.

FIGS. 6A to 6G illustrate the operation of the various portions of the apparatus in FIG. 3 for a video signal of one frame per 1/48 second.

DETAILED DESCRIPTION OF THE PREFERRED EMBODIMENT

Figure 1:
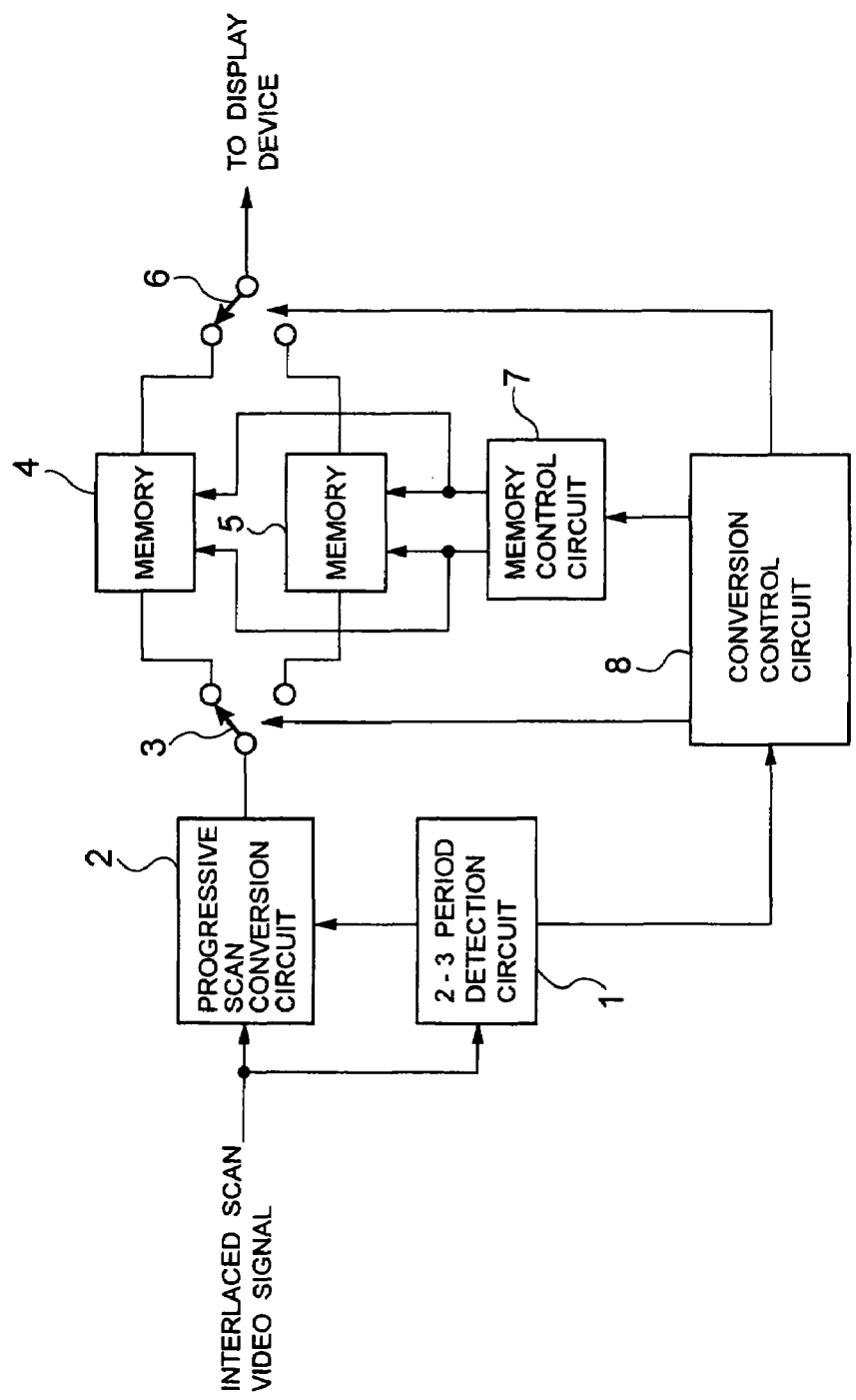
FIG. 1 is a block diagram showing the configuration of a conventional video signal processing apparatus.
Figure 3:
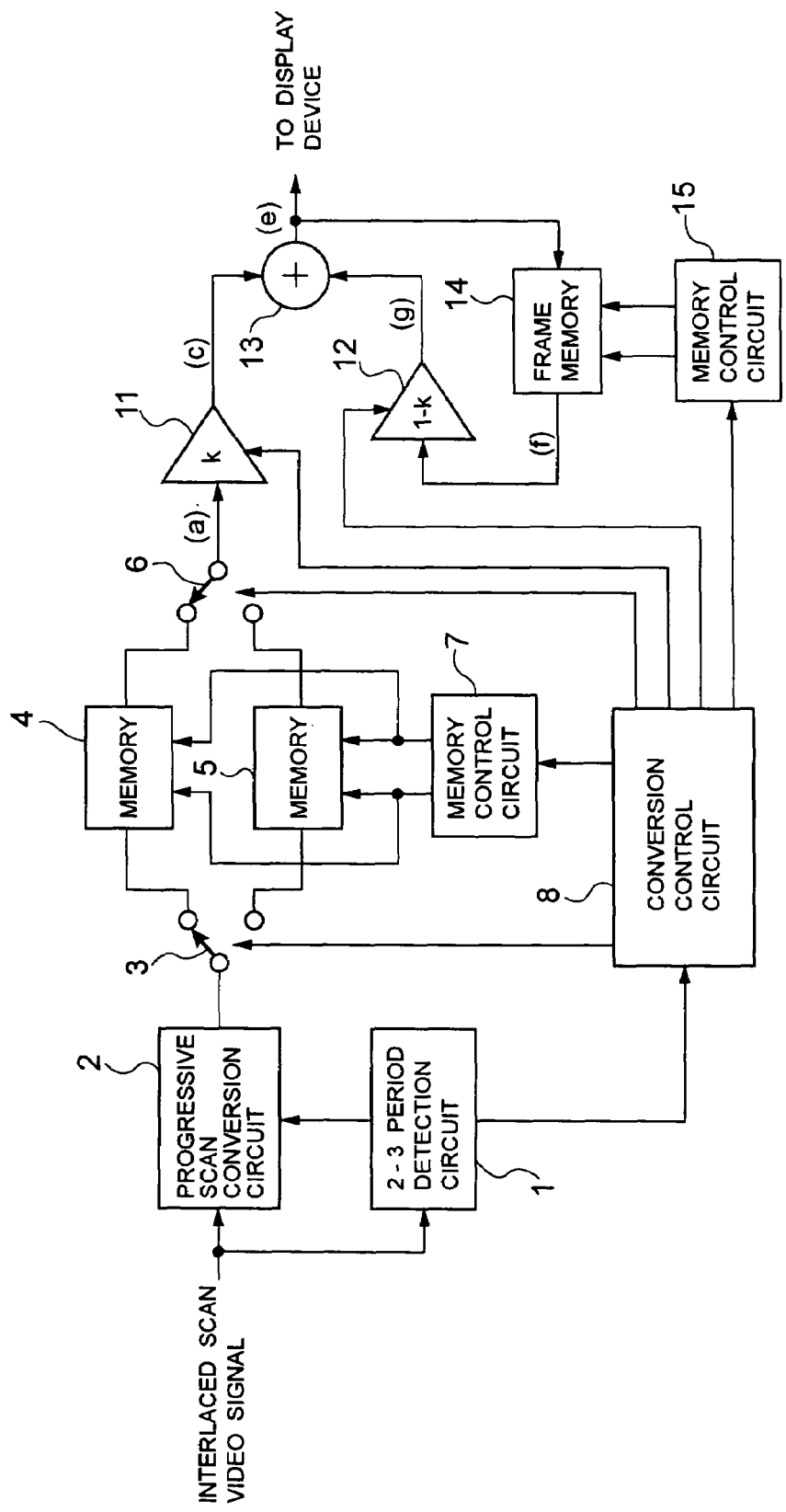
FIG. 3 is a block diagram showing an embodiment of the present invention.

The following is a detailed description of a preferred embodiment of the present invention with reference to the accompanying drawings. FIG. 3 shows a video signal processing apparatus according to the present invention. In addition to the 2-3 period detection circuit 1, the progressive scan conversion circuit 2, the selector switch 3, the memories 4 and 5, the selector switch 6, the memory control circuit 7, and the conversion control circuit 8, as shown in FIG. 1, this video signal processing apparatus includes coefficient multipliers 11 and 12, an adder 13, a frame memory 14 and a memory control circuit 15.

The coefficient multiplier 11 multiplies a video signal supplied from the selector switch 6 by a coefficient k. The coefficient multiplier 12 multiplies a video signal read out from the frame memory 14 by a coefficient 1−k. The adder 13 adds the video signal multiplied by the coefficient multiplier 11 and the video signal multiplied by the coefficient multiplier 12. The output signal from the adder 13 is an output signal of this apparatus.

The video signal output from the adder 13 is written frame by frame into the frame memory 14, so that the video signal written into the frame memory 14 can be read out. A video signal read out from the frame memory 14 is supplied to the coefficient multiplier 12. The memory control circuit 15 controls the reading and writing processes of the frame memory 14.

The coefficient k, which is used for the coefficient multipliers 11 and 12 is set by the conversion control circuit 8. The conversion control circuit 8 also instructs each timing for the writing and reading to the memory control circuit 15.

In this configuration, the 2-3 period detection circuit 1, the progressive scan conversion circuit 2, the selector switch 3, the memories 4 and 5, the selector switch 6, the memory control circuit 7, and the conversion control circuit 8 perform the same operation as in the example of the background art.

Figure 2:
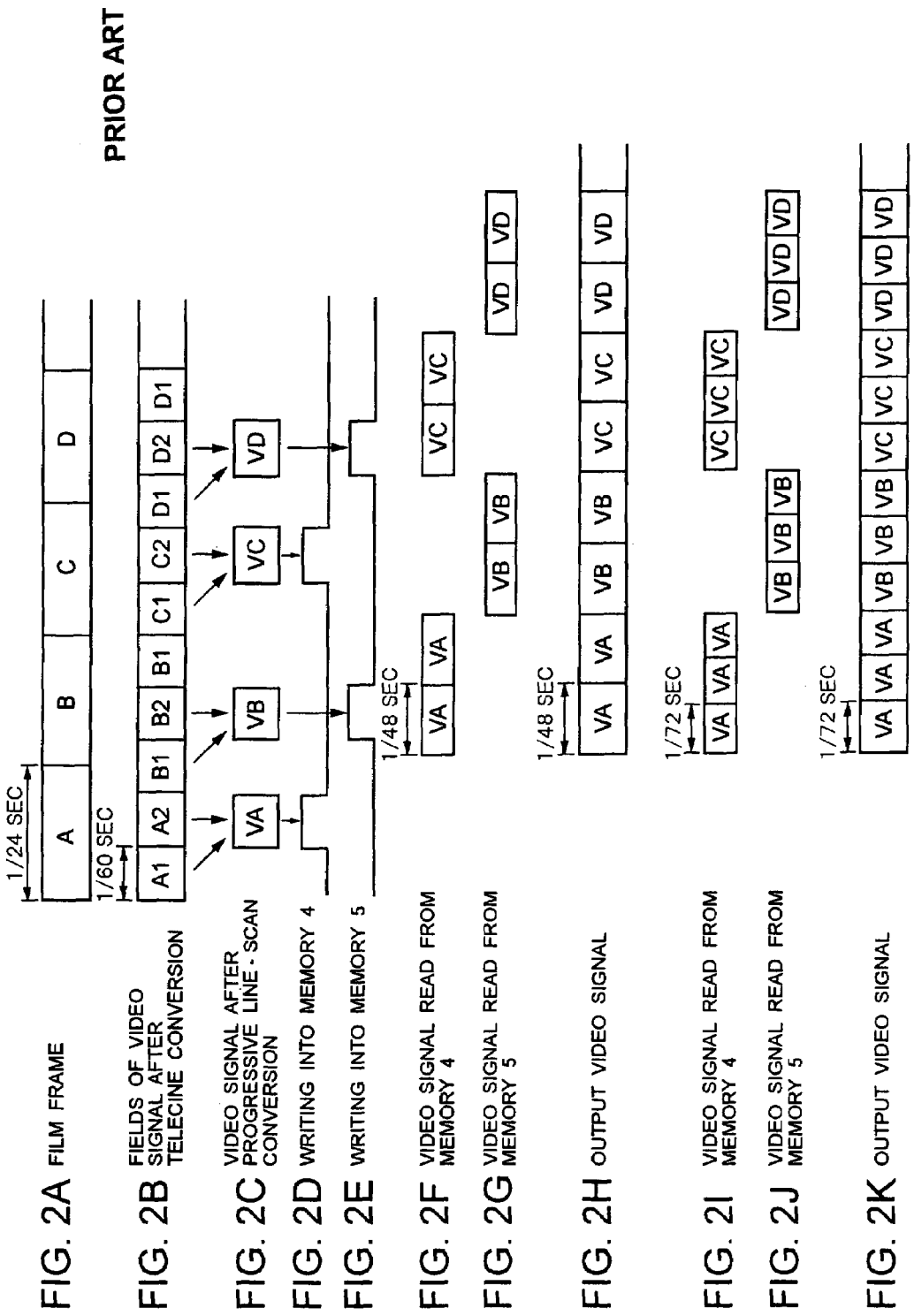
FIGS. 2A to 2K illustrate the operation of various portions of the apparatus in FIG. 1.

Assuming that an interlaced scan video signal input is determined as a telecine-converted video signal by the 2-3 period detection circuit 1. Furthermore, assuming that the video signal portions VA, VA, VA, VB, VB, VB, and so on indicative of one frame every 1/72 second as shown in FIG. 2K are output from the selector switch 6 in response to the input video signal. That is, video signal portions shown in FIG. 4A correspond to the VA, VA, VA, VB, VB, VB, and so on are provided to the coefficient multiplier 11. The multiplication coefficient k of the coefficient multiplier 11 is set every 1/72 second. As shown in FIG. 4B, k is 1 from the beginning to the second frame (1/36 second), and after that 1, 1/3, and 1/2 are repeated in that order. Consequently, the output video signal of the coefficient multiplier 11 becomes VA, VA, VA, VB/3, VB/2, VB, VC/3, VC/2, VC, and so on, as shown in FIG. 4C.

The adder 13 adds the output video signal of the coefficient multiplier 11 and the output video signal of the coefficient multiplier 12. In accordance with the multiplication coefficient k shown in FIG. 4B, the multiplication coefficient 1−k of the coefficient multiplier 12 is set to 0, 0, 0, 2/3, 1/2, 0, 2/3, 1/2, and so on, as shown in FIG. 4D. When 1−k=0, then no signal is output from the coefficient multiplier 12, so that as shown in FIG. 4E, from the beginning to the third frame, the output video signal VA, VA, VA from the coefficient multiplier 11 is supplied as the output signal from the adder 13.

The memory control circuit 7 writes the output video signal of the adder 13 into the frame memory 14. Furthermore, the video signal written by the memory control circuit 7, in the frame memory 14 is read out with one frame delay (that is, 1/72 second) after having been written into the frame memory 14. The video signal that is read out is as shown in FIG. 4F. The read video signal is supplied to the coefficient multiplier 12.

In the fourth frame, the coefficient multiplier 12 takes 1−k=2/3 as the multiplication coefficient, so that as shown in FIG. 4G, the output signal of the multiplier 12 becomes 2VA/3, which is supplied to the adder 13. Thus, while this 2VA/3 is supplied to the adder 13, an output signal VB/3 is supplied from the coefficient multiplier 11, so that the output signal of the adder 13 becomes a mixed video signal VB/3+2VA/3, as shown in FIG. 4E. The mixed video signal VB/3+2VA/3 is output as it is, but it is also delayed by one frame by writing it into and reading from the frame memory 14, and then multiplied by the coefficient 1−k=2/3 in the coefficient multiplier 12 in the fifth frame. The output signal of the coefficient multiplier 12 is VA/3+VB/6, which is supplied to the adder 13. In the fifth frame, an output signal VB/2 of the coefficient multiplier 11 is supplied to the adder 13, so that the adder 13 outputs a mixed video signal VA/3+2VB/3 as a result of the addition. Subsequently, the same operation is repeated.

If the interlaced scan video signal input is a normal video signal, the 2-3 period detection circuit 1 determines that it is not a telecine video signal. Thus, in the progressive scan conversion circuit 2, the selector switch 3, the memories 4 and 5, the selector switch 6, and the memory control circuit 7, the video signal is converted into a non-interlaced scan video signal having one frame of 1/60 second, for example and output from the selector switch 6. The conversion control circuit 8 controls the coefficient multipliers 11 and 12, the adder 13, the frame memory 14 and the memory control circuit 15 at a timing of 1/60 per frame. In the control, the multiplication coefficient k of the coefficient multiplier 11 is constantly set to 1, so that a video signal of 1/60 second per frame is output as it is from the adder 13. Since the output video signal of the selector switch 6 does not need to be converted into a non-interlaced scan video signal, the input video signal may be used as it is.

Next, assuming that an interlaced scan video signal input is a telecine-converted video signal, and due to the frame conversion of the input video signal by the progressive scan conversion circuit 2, the selector switch 3, the memories 4 and 5, the selector switch 6, and the memory control circuit 7, it is output from the selector switch 6 as a video signal VA, VA, VA, VA, VB, VB, VB, VB, and so on, at one frame per 1/96 second, as shown in FIG. 5A.

In this case, the multiplication coefficient k of the coefficient multiplier 11 is set every 1/96 second. As shown in FIG. 5B, k is 1 from the beginning to the third frame (1/32 second), and after that 1, 1/4, 1/3, and 1/2 are repeated in that order. Therefore, the output video signal of the coefficient multiplier 11 becomes VA, VA, VA, VA, VB/4, VB/3, VB/2, VB, VC/4, VC/3, VC/2, VC, and so on, as shown in FIG. 5C.

The adder 13 adds the output video signal of the coefficient multiplier 11 and the output video signal of the coefficient multiplier 12. In accordance with the multiplication coefficient k shown in FIG. 5B, the multiplication coefficient 1−k of the coefficient multiplier 12 is set to 0, 0, 0, 0, 3/4, 2/3, 1/2, 0, 3/4, 2/3, 1/2, and so on, as shown in FIG. 5D. When 1−k=0, then no signal is output from the coefficient multiplier 12, so that as shown in FIG. 5E, from the beginning to the fourth frame the output video signal VA, VA, VA, VA of the coefficient multiplier 11 is given as the output signal of the adder 13.

The memory control circuit 7 writes the output video signal of the adder 13 into the frame memory 14. Furthermore,. the video signal written by the memory control portion 7 is read out with one frame delay (that is, 1/96 second) after having been written into the frame memory 14. The video signal that is read out is as shown in FIG. 5F. The read video signal out is supplied to the coefficient multiplier 12.

In the fifth frame, the coefficient multiplier 12 takes 1−k=3/4 as the multiplication coefficient, so that as shown in FIG. 5G, the output signal of the coefficient multiplier 12 becomes 3VA/4, and is supplied to the adder 13. Thus, while this 3VA/4 is supplied to the adder 13, an output signal VB/4 is supplied from the coefficient multiplier 11, so that the output signal of the adder 13 becomes a mixed video signal VB/4+3VA/4, as shown in FIG. 5E. The mixed video signal VB/4+3VA/4 is output as it is, but it is also delayed by one frame by writing it into and reading from the frame memory 14, and then multiplied by the coefficient 1−k=2/3 in the coefficient multiplier 12 in the sixth frame. The output signal of the coefficient multiplier 12 is VA/2+VB/6, which is supplied to the adder 13. In the sixth frame, the output signal VB/3 of the coefficient multiplier 11 is supplied to the adder 13, so that the adder 13 outputs the mixed video signal VA/2+VB/2 as a result of the addition. Subsequently, the same operation is repeated.

Next, assuming that an interlaced scan video signal input is a telecine-converted video signal, and due to the frame conversion of the input video signal by the progressive scan conversion circuit 2, the selector switch 3, the memories 4 and 5, the selector switch 6, and the memory control circuit 7, it is output from the selector switch 6 as the video signal VA, VA, VB, VB, VC, VC, and so on, with one frame every 1/48 second, as shown in FIG. 2H. That is, the video signal shown in FIG. 6A corresponds to VA, VA, VB, VB, VC, VC, and so on, and is supplied to the coefficient multiplier 11.

In this case, the multiplication coefficient k of the coefficient multiplier 11 is set every 1/48 second. As shown in FIG. 6B, k is 1 in the first frame (1/48 second), and after that 1, and 1/2 are repeated in that order. Therefore, the output video signal of the coefficient multiplier 11 becomes VA, VA, VB/2, VB, VC/2, VC, VD/2, VD, and so on, as shown in FIG. 6C.

The adder 13 adds the output video signal of the coefficient multiplier 11 and the output video signal of the coefficient multiplier 12. In accordance with the coefficient k shown in FIG. 6B, the multiplication coefficient 1−k of the coefficient multiplier 12 is set to 0, 0, 1/2, 0, 1/2, 1/2, 0, and so on, as shown in FIG. 6D. When 1−k=0, then no signal is output from the coefficient multiplier 12, so that as shown in FIG. 6E, from the beginning to the second frame, the output video signal VA, VA of the coefficient multiplier 11 is given as the output signal of the adder 13.

The memory control circuit 7 writes the output video signal of the adder 13 into the frame memory 14. Furthermore, the video signal written by the memory control portion 7 into the frame memory 14 is read out with one frame delay (that is, 1/48 second) after having been written into the frame memory 14. The video signal that is read out is as shown in FIG. 6F. The read video signal is supplied to the coefficient multiplier 12.

In the third frame, the coefficient multiplier 12 takes 1−k=1/2 as the multiplication coefficient, so that as shown in FIG. 6G, the output signal of the coefficient multiplier 12 becomes VA/2, which is supplied to the adder 13. Thus, while this VA/2 is supplied to the adder 13, an output signal VB/2 is supplied from the coefficient multiplier 11 to the adder 13, so that the output signal of the adder 13 becomes a mixed video signal VB/2+VA/2, as shown in FIG. 6E. The mixed video signal VB/2+2VA/2 is output as it is, but it is also delayed by one frame by writing it into and reading from the frame memory 14, and then multiplied by the coefficient 1−k=0 by the coefficient multiplier 12 in the fourth frame. Since no signal is output by the coefficient multiplier 12, no signal is supplied to the adder 13 by the coefficient multiplier 12. In the fourth frame, the output signal VB of the coefficient multiplier 11 is supplied to the adder 13, so that the adder 13 outputs the mixed video signal VB as it is.

In the fourth frame, the coefficient multiplier 12 takes 1−k=0 as the multiplication coefficient, so that the output signal of the coefficient multiplier 12 becomes as shown in FIG. 6G, and no signal is supplied from the coefficient multiplier 12 to the adder 13. Thus, an output signal VB of the coefficient multiplier 11 is supplied to the adder 13, so that the output signal of the adder 13 becomes merely the video signal VB, as shown in FIG. 6E. This video signal VB is output as it is, but it is also delayed by one frame by writing it into and reading from the frame memory 14, and then multiplied by the coefficient 1−k=½ in the coefficient multiplier 12 in the fifth frame. The signal that is output by the coefficient multiplier 12 is VB/2, and this signal is supplied to the adder 13. In the fifth frame, the output signal VC/2 of the coefficient multiplier 11 is supplied to the adder 13, so that the adder 13 adds these and outputs the mixed video signal VB/2+VC/2. Subsequently, the same operation is repeated.

In the above embodiment, a video signal processing apparatus was described, in which the input video signal is an interlaced scan video signal. If a normal progressive line-scan video signal based on a film is received or input (in this case, an ID signal is also sent together with the film-based video signal, for example), then the apparatus is configured such that the input video signal is supplied directly to the frame-rate conversion circuit. Furthermore, the film ID signal that has been received or input at the same time is supplied to the conversion control circuit.

According to the present invention as described above, a video signal of a preceding frame is mixed frame by frame with a video signal of a following frame of a progressive line-scan video signal that has been frame-rate converted, so that a video display is achieved in which the mixing is suitably adapted for movements of the viewer s eyes, and flickering can be reduced. Thus, the display quality of telecine-converted images can be improved.

This application is based on a Japanese Patent Application No. 2002-73533 which is hereby incorporated by reference.

What is claimed is:

1. A video signal processing apparatus comprising:
a frame-rate converter which performs a frame-rate conversion of a progressive line-scan video signal based on a film source having M film frames per second (wherein M is a natural number) into a converted progressive line-scan video signal in which each film frame is repeated by N times for each 1/M second (wherein N is an integer of two or greater); and
a mixer which mixes, frame by frame, a video signal of a preceding frame and a video signal of a following frame of the converted progressive line-scan video signal, wherein said mixer includes:
a first coefficient multiplier which multiplies the video signal of the following frame by a first multiplication coefficient;
a second coefficient multiplier which multiplies a mixed output video signal of the preceding frame by a second multiplication coefficient; and
an adder which adds an output video signal of said first coefficient multiplier to an output video signal of said second coefficient multiplier to produce the mixed output signal of the following frame;
wherein the second multiplication coefficient is a value obtained by subtracting the first multiplication coefficient at that time from one.

2. A video signal processing apparatus according to claim 1, wherein the first multiplication coefficient and the second multiplication coefficient are set for each frame.

3. A video signal processing apparatus according to claim 1, wherein a number of different values of the first multiplication coefficient that the first coefficient multiplier uses depends on N.

4. A video signal processing apparatus according to claim 3, wherein the number of different values of the first multiplication coefficient equals N.

5. A video signal processing apparatus according to claim 4, wherein, when N equal two, the different values of the first multiplication coefficient equals 1/N and one, and
wherein, when N is greater than two, the different values of the first multiplication coefficient equals 1/N, 1/(N−1), . . . , and one.

6. A video signal processing apparatus comprising:
a frame-rate converter which performs a frame-rate conversion of a progressive line-scan video signal based on a film source having M film frames per second (wherein M is a natural number) into a converted progressive line-scan video signal in which each film frame is repeated by N times for each 1/M second (wherein N is an integer of two or greater);
a controller which sets a multiplication coefficient for each frame of the converted progressive line-scan video signal;
a mixer which mixes, frame by frame, the converted progressive line-scan video signal and a delayed video signal at a mixing rate based on the set multiplication coefficient to output a mixed video signal; and
a memory which delays the mixed video signal by a time period of one frame to generate the delayed video signal,
wherein said controller has N multiplication coefficients, which are different from each other, corresponding to the N times of the frame repeat, selects one of the N multiplication coefficients in turn, for each frame of the converted progressive line-scan video signal, and supplies the selected one coefficient as the set multiplication coefficient, to said mixer.

7. A video signal processing apparatus according to claim 6, wherein said mixer includes:
a first coefficient multiplier which multiplies the converted progressive line-scan video signal by a first multiplication coefficient;
a second coefficient multiplier which sets the output video signal of the first coefficient multiplier to the video signal of the preceding frame and multiplies the set video signal of the preceding frame by a second multiplication coefficient; and
an adder which adds an output video signal of said first coefficient multiplier to an output video signal of said second coefficient multiplier to obtain the mixed video signal;
wherein the first multiplication coefficient is the set multiplication coefficient, and the second multiplication coefficient is a value obtained by subtracting the first multiplication coefficient at the time from one.

* * * * *